US011319897B2

(12) United States Patent
Joo et al.

(10) Patent No.: US 11,319,897 B2
(45) Date of Patent: May 3, 2022

(54) EXHAUST DUCT AND EXHAUST DUCT ASSEMBLY AND AIRCRAFT USING THE EXHAUST DUCT

(71) Applicants: HANWHA AEROSPACE CO., LTD., Changwon-si (KR); Pratt & Whitney Canada Corp., Quebec (CA)

(72) Inventors: Young Jung Joo, Changwon-si (KR); Hee Yoon Chung, Changwon-si (KR); Eray Akcayoz, Quebec (CA)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 0 days.

(21) Appl. No.: 16/834,180

(22) Filed: Mar. 30, 2020

(65) Prior Publication Data
US 2021/0215121 A1    Jul. 15, 2021

(30) Foreign Application Priority Data
Jan. 10, 2020 (KR) .................... 10-2020-0003876

(51) Int. Cl.
| | |
|---|---|
| F02K 1/40 | (2006.01) |
| F02K 1/78 | (2006.01) |
| F01D 25/30 | (2006.01) |

(52) U.S. Cl.
CPC .............. *F02K 1/40* (2013.01); *F01D 25/30* (2013.01); *F02K 1/78* (2013.01); *F05D 2250/52* (2013.01)

(58) Field of Classification Search
CPC .. B64D 33/04; B64D 33/06; B64D 2033/045; F01D 25/30; F02K 1/40; F02K 1/42; F01N 2470/14; F01N 2490/10; F16L 41/023
See application file for complete search history.

(56) References Cited

U.S. PATENT DOCUMENTS 2,533,720 A * 12/1950 Danel .................. F16L 41/023
                                                    285/132.1
2,796,732 A *  6/1957 Penn ....................... F01D 25/30
                                                    60/785
(Continued)

FOREIGN PATENT DOCUMENTS

| EP | 3 418 507 A1 | 12/2018 |
|---|---|---|
| EP | 2 905 227 B1 | 3/2019 |

OTHER PUBLICATIONS

Diogo Maria Quintino Rogado de Mesquita Guimarães, Implementation of an Engine Condition Trend Monitoring (ECTM) program in a Part M organization, Pratt & Whitney PT6A-67D Engine, 2015, Universidade Da Beira Interior, 3, 5, 7, 11 and 29. (Year: 2015).*

*Primary Examiner* — Todd E Manahan
*Assistant Examiner* — Marc J Amar
(74) *Attorney, Agent, or Firm* — Sughrue Mion, PLLC

(57) ABSTRACT

Provided are an exhaust duct, an exhaust duct assembly, and an aircraft using the exhaust duct. The exhaust duct has a structure that enables combustion gas to be diverged and discharged from an inlet end to a first outlet end and a second outlet end at respective sides of the exhaust duct. The exhaust duct includes a first housing including a first body forming an outer wall of the inlet end, and further includes second bodies respectively extending on respective sides from the first body and respectively forming the first outlet end and the second outlet end; a second housing spaced apart from the first body, forming an inner wall of the inlet end, and extending curvedly toward the second bodies; and a connection housing connecting the first housing to the second housing and including at least one recess portion recessed toward the inlet end.

14 Claims, 7 Drawing Sheets

(56) References Cited

U.S. PATENT DOCUMENTS

| | | | | |
|---|---|---|---|---|
| 2,945,350 A * | 7/1960 | Gilbert | B64C 27/14 | 60/805 |
| 3,025,667 A * | 3/1962 | Moorehead | F02K 1/40 | 239/265.25 |
| 3,290,877 A * | 12/1966 | Millar | F01D 25/30 | 60/39.5 |
| 3,388,550 A * | 6/1968 | Binek | F01D 25/30 | 60/39.5 |
| 4,254,620 A * | 3/1981 | Wright | B64C 9/38 | 181/220 |
| 4,608,961 A | 9/1986 | Lanham, Jr. et al. | | |
| 5,123,501 A * | 6/1992 | Rothman | F01N 1/08 | 181/227 |
| 5,201,800 A * | 4/1993 | Wolf | F02K 1/1223 | 239/265.19 |
| 5,699,662 A * | 12/1997 | Born | F02K 1/825 | 60/39.5 |
| 6,122,907 A * | 9/2000 | Frawley | B64D 33/04 | 60/264 |
| 6,290,173 B1 * | 9/2001 | Nickels | B64D 33/04 | 244/129.1 |
| 6,959,552 B2 * | 11/2005 | Leblanc | F02C 7/055 | 137/15.1 |
| 8,640,734 B2 * | 2/2014 | Lee | F16L 41/02 | 137/561 A |
| 9,381,787 B2 * | 7/2016 | Vignali | B60H 1/00564 | |
| 9,944,393 B1 * | 4/2018 | Lorence | B63H 11/107 | |
| 2002/0096393 A1 * | 7/2002 | Rouse | F02K 1/40 | 181/239 |
| 2005/0217239 A1 * | 10/2005 | Wollenweber | B64D 33/04 | 60/262 |
| 2007/0000233 A1 * | 1/2007 | Page | F02K 1/40 | 60/228 |
| 2007/0251211 A1 * | 11/2007 | Daris | F02K 1/40 | 60/230 |
| 2007/0266712 A1 * | 11/2007 | Brunet | B64D 33/04 | 60/771 |
| 2010/0212285 A1 * | 8/2010 | Negulescu | B64D 27/14 | 60/226.1 |
| 2010/0247304 A1 * | 9/2010 | Merchant | B64D 33/04 | 415/207 |
| 2011/0200421 A1 * | 8/2011 | Gallier | F01D 25/30 | 415/1 |
| 2012/0034064 A1 * | 2/2012 | Nanda | F01D 25/30 | 415/1 |
| 2013/0100759 A1 * | 4/2013 | Wittbold | B28C 5/003 | 366/3 |
| 2014/0084080 A1 * | 3/2014 | Robertson | B64D 33/06 | 239/127.3 |
| 2014/0190884 A1 * | 7/2014 | DiBiasio | B01D 63/088 | 210/428 |
| 2014/0215999 A1 * | 8/2014 | Pantalone, III | B64D 33/04 | 60/39.5 |
| 2015/0218967 A1 * | 8/2015 | Anderson | F01D 25/30 | 60/39.5 |
| 2016/0177872 A1 * | 6/2016 | Akcayoz | F01D 25/30 | 239/265.11 |
| 2016/0341093 A1 * | 11/2016 | Zhang | B01D 53/8631 | |
| 2017/0037756 A1 * | 2/2017 | Julien | F02K 1/386 | |
| 2017/0108153 A1 * | 4/2017 | Witkowski | F16L 41/023 | |
| 2018/0291743 A1 * | 10/2018 | Hoffman | F01D 5/081 | |
| 2018/0363588 A1 * | 12/2018 | Iglewski | F02C 6/18 | |
| 2019/0084683 A1 * | 3/2019 | Schwoller | F02K 3/062 | |

* cited by examiner

EXHAUST DUCT AND EXHAUST DUCT ASSEMBLY AND AIRCRAFT USING THE EXHAUST DUCT

CROSS-REFERENCE TO THE RELATED APPLICATION

This application claims priority from and is based on Korean Patent Application No. 10-2020-0003876, filed on Jan. 10, 2020, in the Korean Intellectual Property Office, the disclosure of which is incorporated herein in its entirety by reference.

BACKGROUND

1. Field

One or more embodiments relate to an exhaust duct, an exhaust duct assembly, and an aircraft using the exhaust duct.

2. Description of Related Art

An exhaust duct is provided in a turbo-prop engine, a turbo-fan engine, a turbo-shaft engine, or the like to exhaust to the outside combustion gas that has passed through a driving engine. The exhaust duct is arranged behind a low-pressure turbine (power turbine) based on the movement direction of combustion gas. The combustion gas passed through the low-pressure turbine is exhausted to the outside by passing through the exhaust duct.

SUMMARY

An exhaust duct is a structure that receives a combination of a mechanical load and a thermal load because high-temperature and high-pressure combustion gas flows therein. Also, because the exhaust duct is installed at one side of an aircraft to exhaust combustion gas to the outside, it also affects the aerodynamic characteristics of the aircraft. Thus, the exhaust duct should be designed to have a shape capable of satisfying both excellent aerodynamic characteristics and stress characteristics.

One or more embodiments include an exhaust duct satisfying excellent aerodynamic, stress, and life characteristics, an exhaust duct assembly, and an aircraft using the exhaust duct. However, this is merely an example and the scope of the present disclosure is not limited thereto.

According to one or more embodiments, provided is an exhaust duct through which combustion gas is diverged and discharged from an inlet end to a first outlet end and a second outlet end at respective sides of the exhaust duct, the exhaust duct including: a first housing including a first body forming an outer wall of the inlet end, and further including second bodies respectively extending on respective sides from the first body and respectively forming the first outlet end and the second outlet end; a second housing spaced apart from the first body, forming an inner wall of the inlet end, and extending curvedly toward the second bodies; and a connection housing connecting the first housing to the second housing and including at least one recess portion recessed toward the inlet end.

According to an embodiment, the at least one recess portion is arranged at a center of a virtual extension line that extends from the first outlet end to the second outlet end.

According to an embodiment, the at least one recess portion of the connection housing includes a pair of recess portions, and the pair of recess portions is arranged to face each other and arranged to connect the first outlet end and the second outlet end.

According to an embodiment, each of the at least one recess portion has a first surface including: a first curvature radius having a radius center arranged inside the first body, the first surface, via the first curvature radius, connecting the first body to the second housing, and a second curvature radius having a radius center arranged outside the connection housing and extending along the connection housing in a different direction than the first curvature radius, wherein the second curvature radius is greater than the first curvature radius. According to an embodiment, the connection housing has second surfaces arranged along a virtual extension line extending from the first outlet end and the second outlet end at the respective sides of the exhaust duct, wherein the virtual extension line has a third curvature radius having a radius center arranged outside the connection housing, and the third curvature radius is greater than the first curvature radius. According to an embodiment, the exhaust duct is configured to satisfy a relationship of $r1<r2<1.35r1$, wherein $r1$ is the first curvature radius and $r2$ is the second curvature radius.

According to an embodiment, the at least one recess portion includes: a splitter which is adjacent to the inlet end, the splitter configured to diverge the combustion gas to the respective sides of the exhaust duct; and flow guides arranged on a side of the splitter towards the first outlet end and a side of the splitter towards the second outlet end, respectively, the flow guides each having a preset inclination. According to an embodiment, each of the flow guides has a preset inclination angle with respect to an axial direction of the exhaust duct. According to an embodiment, each of the flow guides has a preset inclination angle with respect to an axial direction of the exhaust duct. According to an embodiment, the preset inclination angle of each of the flow guides is greater than or equal to 30°. According to an embodiment, the preset inclination angle of each of the flow guides is less than or equal to 40°.

According to an embodiment, the third curvature radius is greater than the first curvature radius and the second curvature radius.

According to one or more embodiments, an exhaust duct assembly includes: an exhaust duct configured to exhaust combustion gas by diverging and discharging the combustion gas from an inlet end to a first outlet end and a second outlet end at respective sides of the exhaust duct; a housing in which the exhaust duct is arranged and which includes a mounting ports into which the first outlet end and the second outlet end are inserted, respectively; and a first reinforcement body and a second reinforcement body, one side of the first reinforcement body mounted onto the housing and another side of the first reinforcement body supporting an end portion of the first outlet end, and one side of the second reinforcement body mounted onto the housing and another side of the second reinforcement body supporting an end portion of the second outlet end, wherein the exhaust duct includes: a first housing including a first body forming an outer wall of the inlet end, and further including second bodies respectively extending on respective sides from the first body and respectively forming the first outlet end and the second outlet end; a second housing spaced apart from the first body, forming an inner wall of the inlet end, and extending curvedly toward the second bodies; and a connection housing connecting the first housing to the second housing and including at least one recess portion recessed toward the inlet end.

According to one or more embodiments, an aircraft includes: a propeller arranged at a front end thereof; a driving engine connected to the propeller; and an exhaust duct configured to exhaust combustion gas discharged from the driving engine, to an outside, wherein the exhaust duct is configured to diverge and discharge the combustion gas from an inlet end to a first outlet end and a second outlet end at respective sides of the exhaust duct, and the exhaust duct includes: a first housing including a first body forming an outer wall of the inlet end, and further including second bodies respectively extending on respective sides from the first body and respectively forming the first outlet end and the second outlet end; a second housing spaced apart from the first body, forming an inner wall of the inlet end, and extending curvedly toward the second bodies; and a connection housing connecting the first housing to the second housing and including at least one recess portion recessed toward the inlet end.

Additional aspects will be set forth in part in the description which follows and, in part, will be apparent from the description, or may be learned by practice of the presented embodiments of the disclosure.

Other aspects, features, and advantages other than those described above will become apparent from the following detailed description, the appended claims, and the accompanying drawings.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
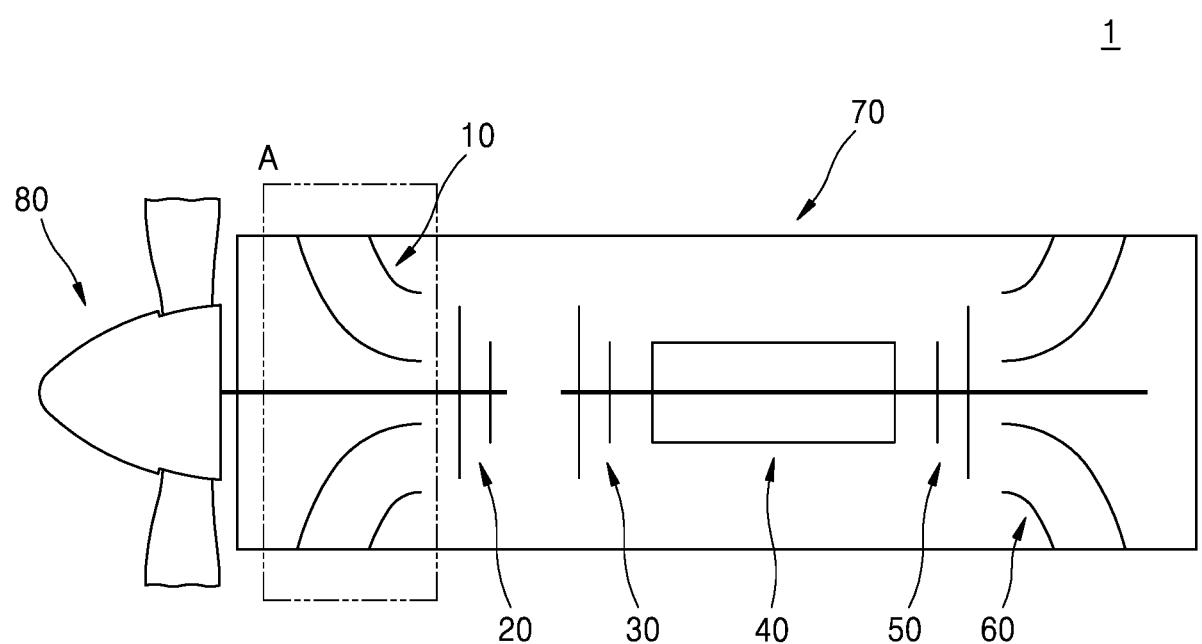
FIG. 1 is a diagram illustrating an example of an engine to which an exhaust duct assembly according to an embodiment is applied.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Spatially relative terms, such as "beneath," "below," "lower," "under," "on," "over," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Although terms such as "first" and "second" may be used herein to describe various elements or components, these elements or components should not be limited by these terms. These terms are only used to distinguish one element or component from another element or component.

The terminology used herein is for the purpose of describing particular embodiments only and is not intended to limit the present disclosure. It will be understood that terms such as "comprise," "include," and "have," when used herein, specify the presence of stated features, integers, steps, operations, elements, components, or combinations thereof, but do not preclude the presence or addition of one or more other features, integers, steps, operations, elements, components, or combinations thereof.

Hereinafter, embodiments of the present disclosure will be described in detail with reference to the accompanying drawings.

FIG. 1 is a diagram illustrating an example of an engine 1 to which an exhaust duct assembly 10 according to an embodiment is applied.

Referring to FIG. 1, an exhaust duct assembly 10 according to an embodiment may be applied to an engine 1 of an aircraft. For example, the engine 1 may be a turbo-prop engine. The engine 1 may include an exhaust duct assembly 10, a low-pressure turbine (power turbine) 20, a high-pressure turbine 30, a combustor 40, a compressor 50, an intake duct 60, a nacelle 70, and a propeller 80.

First, the external air introduced into the nacelle 70 through the intake duct 60 may pass through the compressor 50 and the combustor 40 to be in a state of high temperature and high pressure. Next, the external air may be expanded through the high-pressure turbine 30 and then supplied to the low-pressure turbine 20. The low-pressure turbine 20 may be driven by the supplied external air and thus the propeller 80 connected to the low-pressure turbine 20 through a driving shaft may be rotated. Then, the external air exiting the low-pressure turbine 20 may be exhausted outside through the exhaust duct assembly 10.

As illustrated in FIG. 1, the exhaust duct assembly 10 may be arranged in the nacelle 70 to exhaust to the outside the external air that has passed through the low-pressure turbine 20. Also, a portion of the driving shaft and/or the low-pressure turbine 20 may be arranged in the exhaust duct assembly 10.

Figure 2:
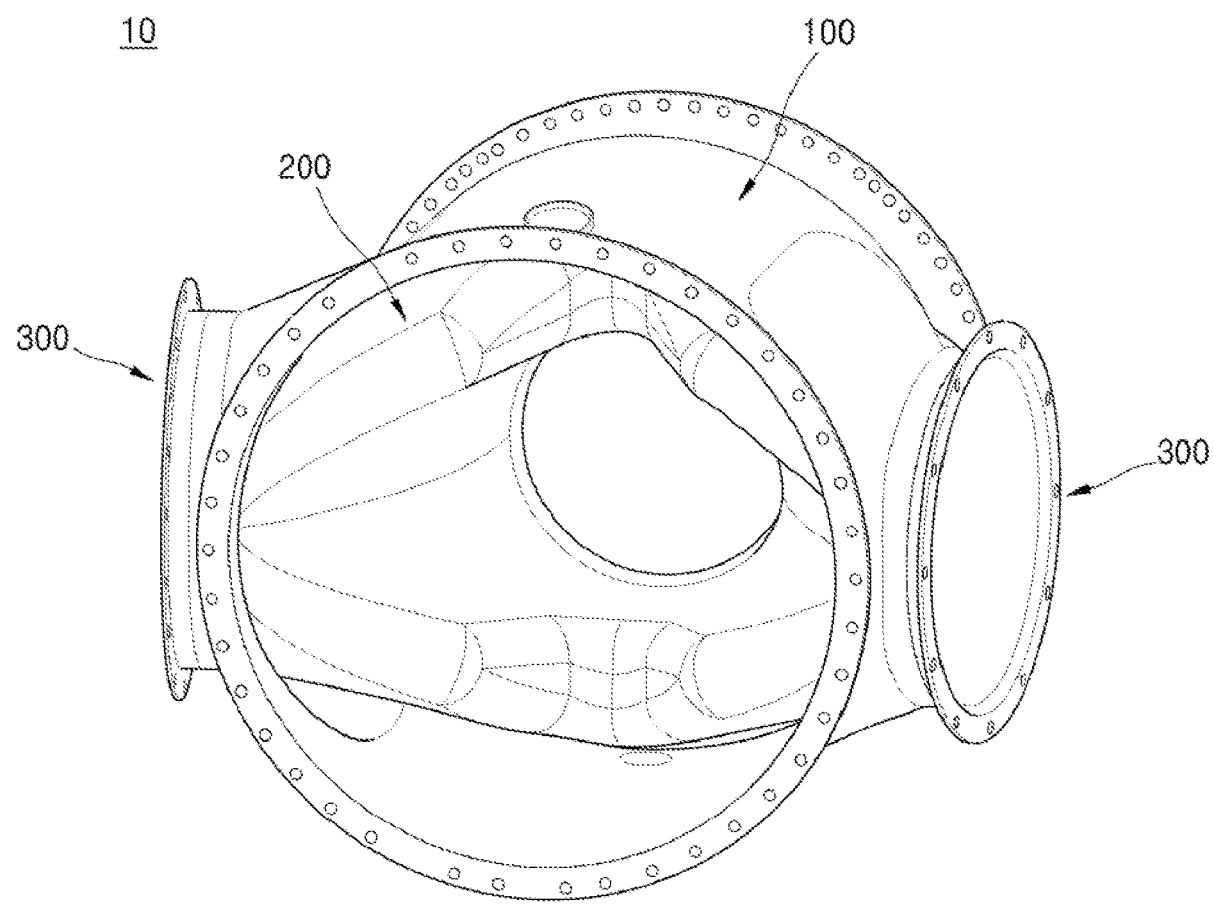
FIG. 2 is a diagram illustrating an exhaust duct assembly of FIG. 1.
Figure 3:
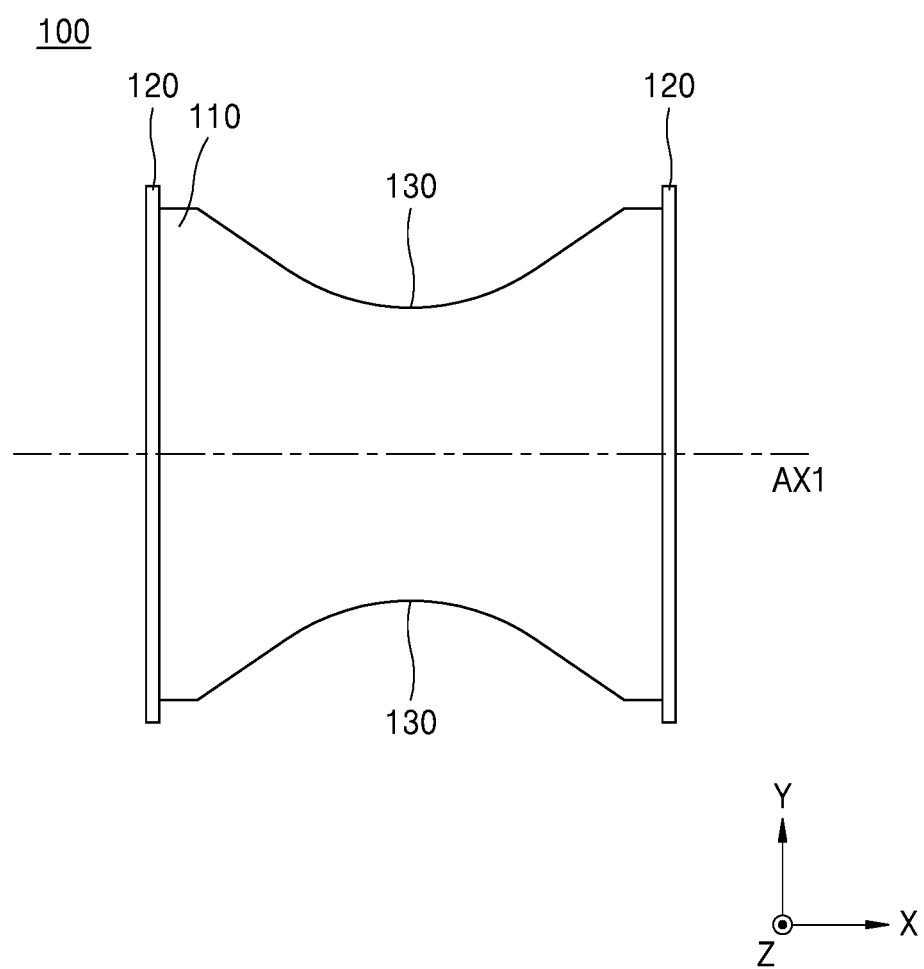
FIG. 3 is a diagram illustrating a housing of FIG. 2.

FIG. 2 is a diagram illustrating the exhaust duct assembly 10 of FIG. 1, and FIG. 3 is a diagram illustrating a housing 100 of FIG. 2. More particularly, FIG. 3 is a plan view of the housing 100.

Referring to FIGS. 2 and 3, the exhaust duct assembly 10 may include a housing 100, an exhaust duct 200, and reinforcement bodies 300.

The housing 100 may fix the exhaust duct assembly 10 to one side of the nacelle 70 and may prevent the interference or collision with other members. The housing 100 may include a body 110, a flange 120, and mounting ports 130.

The body 110 may have a cylindrical shape and may include an internal space in which the exhaust duct 200 is arranged. The body 110 may have a central axis AX1 in the lengthwise direction, for example, in the X-axis direction of FIG. 3. In an embodiment, the central axis AX1 may be located on the XY plane of FIG. 3. Alternatively, the central axis AX1 may be inclined at a certain angle with respect to the XY plane.

The body 110 may be integrally formed or may be formed by combining a plurality of segments. For example, the body 110 may be formed by combining a certain number of parts divided in the circumferential direction.

The flange 120 may be formed at each of both ends of the body 110 and a plurality of through holes may be formed at one surface thereof. Through the through holes, the flange 120 may be welded or fastened to another member by a connection member such as a bolt.

The mounting ports 130 may be each formed at a respective side of the body 110. The mounting ports 130 may be formed to be cut out such that the outlet ends of the exhaust duct 200 may be inserted therein, respectively. The shape or number of mounting ports 130 is not particularly limited and may correspond to the shape and number of outlet ends to be inserted thereinto. For example, as illustrated in FIG. 3, two mounting ports 130 may be formed to be symmetrical with respect to the central axis AX1 of the housing 100. Also, when viewed from a plan view, each of the mounting ports 130 may have a shape recessed toward the central axis AX1 from the outer circumferential surface of the body 110.

The maximum outer diameter of each of the mounting ports 130 may be greater than the maximum outer diameter of the outlet end inserted therein. Accordingly, the outlet ends may be easily inserted into the mounting ports 130. Also, the difference between the maximum outer diameters of the mounting ports 130 and the outlet ends may allow the outlet ends to be expanded by the combustion gas, thus preventing the occurrence of an excessive thermal stress in the exhaust duct 200.

Figure 4:
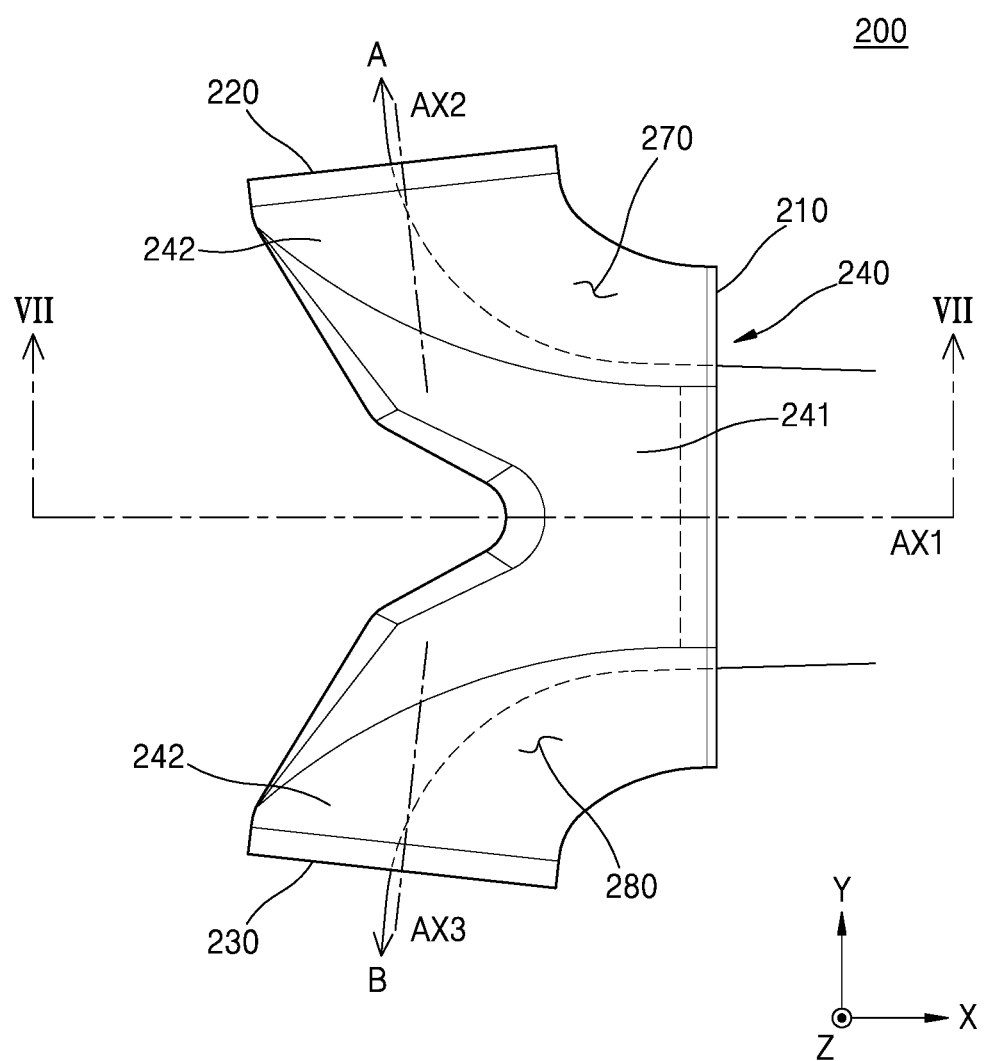
FIG. 4 is a first diagram illustrating a top plan view of an exhaust duct of FIG. 2.
Figure 5:
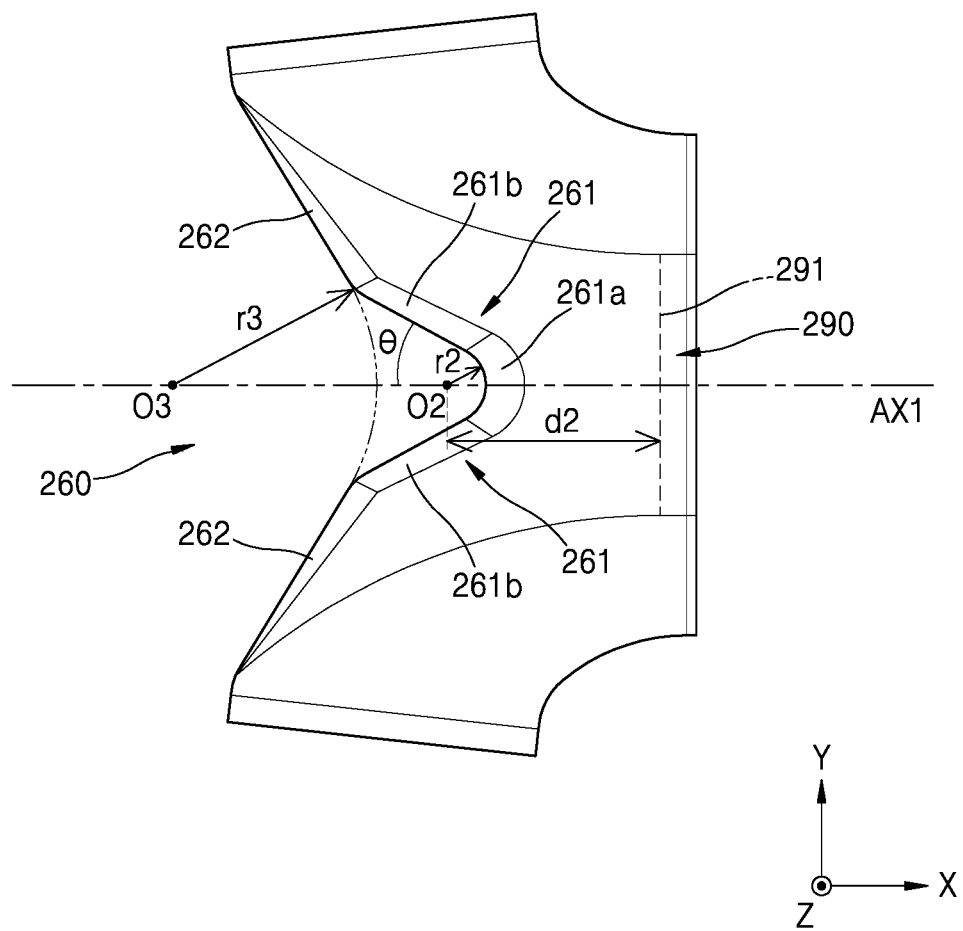
FIG. 5 is a second diagram illustrating the top plan view of the exhaust duct of FIG. 2.
Figure 6:
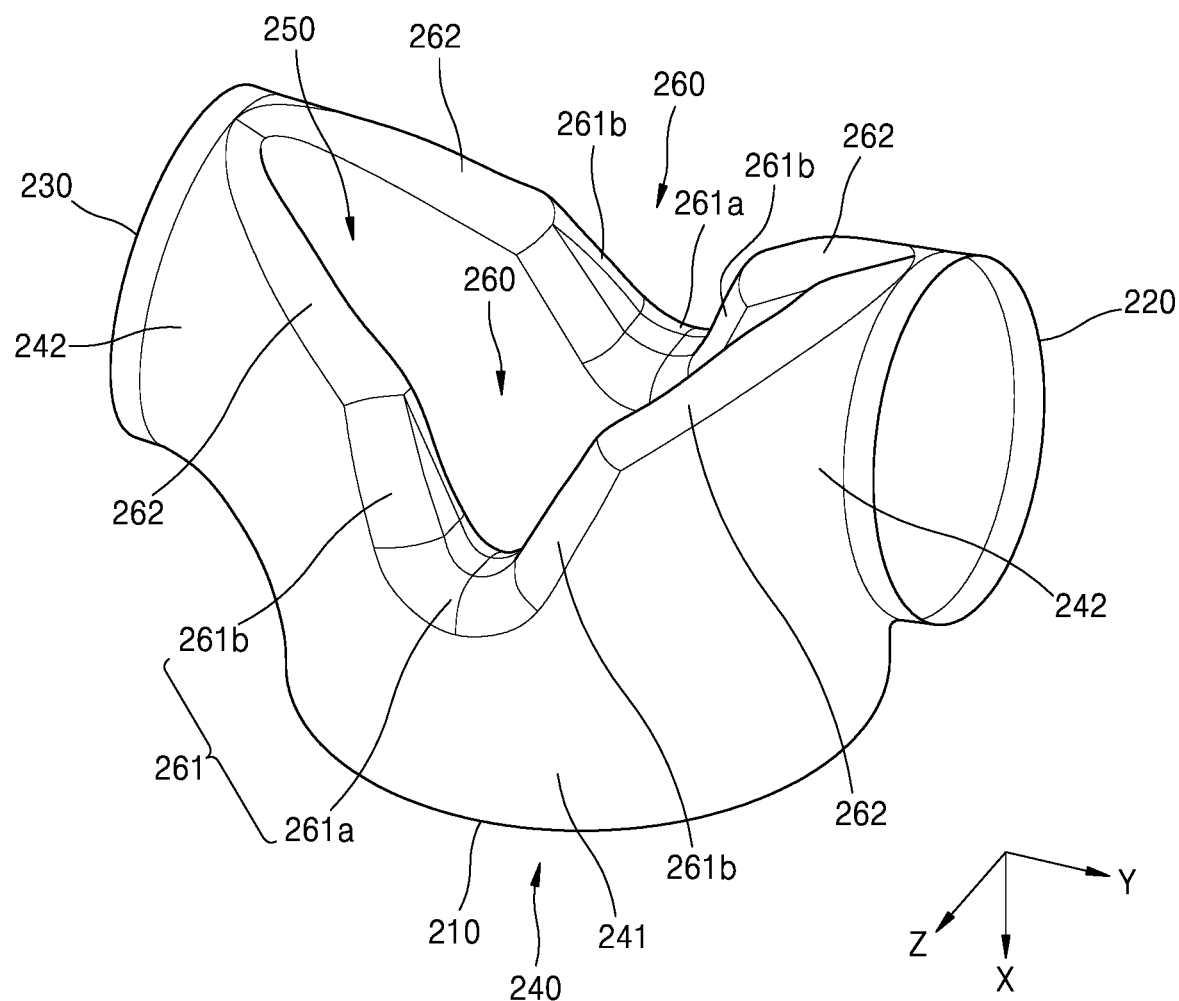
FIG. 6 is a perspective view of the exhaust duct of FIG. 2.
Figure 7:
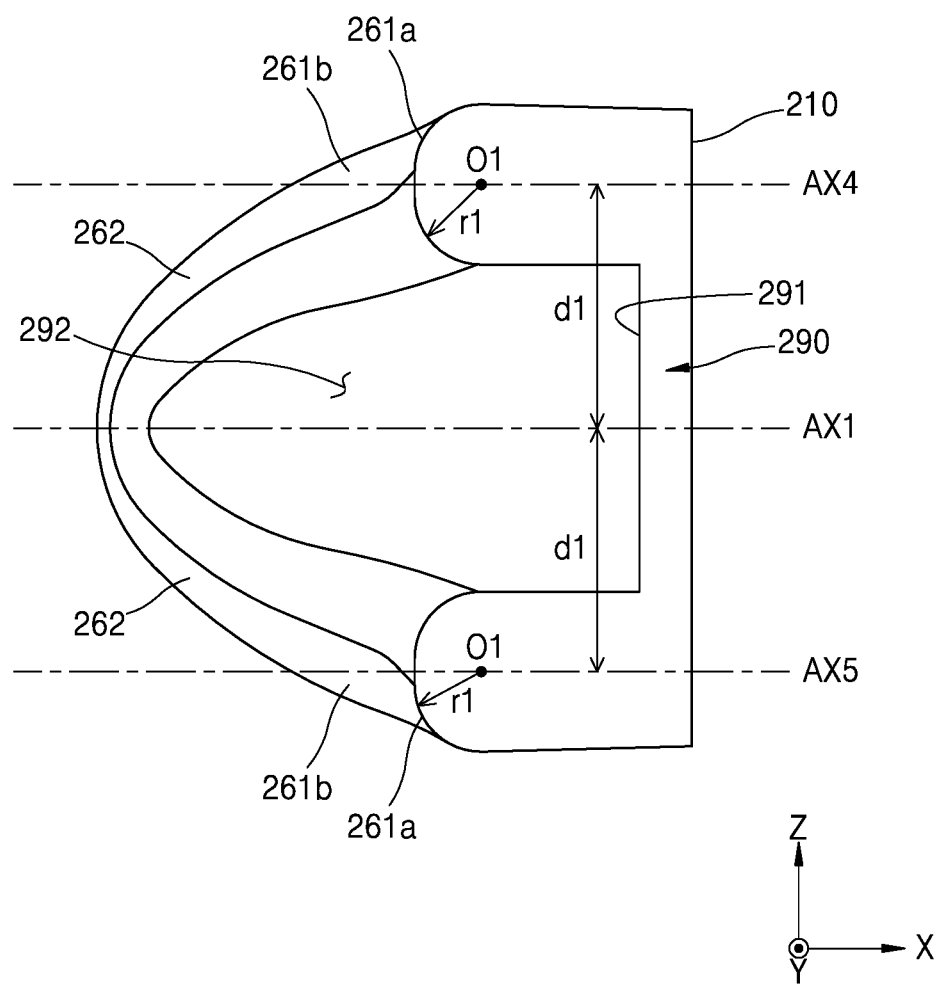
FIG. 7 is a cross-sectional view of the exhaust duct taken along line VII-VII of FIG. 4.

FIGS. 4 to 6 are diagrams illustrating the exhaust duct 200 of FIG. 2, and FIG. 7 is a cross-sectional view of the exhaust duct 200 taken along line VII-VII of FIG. 4. More particularly, FIGS. 4 and 5 are top plan views of the exhaust duct 200, and FIG. 6 is a perspective view of the exhaust duct 200. Also, for convenience of description, in FIGS. 4 and 5, only different reference numerals are illustrated for the same exhaust duct 200.

Referring to FIGS. 1, 2, and 4, the exhaust duct 200 may be arranged in the housing 100 and may include a flow path through which the combustion gas passed through the low-pressure turbine 20 is exhausted to the outside. The combustion gas passed through the low-pressure turbine 20 may be introduced into the inlet end 210 of the exhaust duct 200 and then diverged to the outlet ends at two sides of the exhaust duct 200 and exhausted to the outside. The exhaust duct 200 may have a symmetrical shape with respect to the central axis AX1.

Referring to FIGS. 4 to 6, the exhaust duct 200 may include an inlet end 210, a first outlet end 220, a second outlet end 230, a first housing 240, a second housing 250, and connection housings 260.

The inlet end 210 may be an inlet through which the combustion gas passed through the low-pressure turbine 20 is introduced. The inlet end 210 may share a central axis with the central axis AX1 of the exhaust duct 200. The shape of the inlet end 210 is not particularly limited and may be annular in an embodiment. The combustion gas introduced into the inlet end 210 may flow to the first outlet end 220 and the second outlet end 230.

The inlet end 210 may have an outer wall formed of the first housing 240 and an inner wall formed of the second housing 250. That is, the inlet end 210 may be defined as a space surrounded by the first housing 240 and the second housing 250.

The first outlet end 220 and the second outlet end 230 may be defined as a space surrounded by the first housing 240, the second housing 250, and the connection housings 260.

As indicated by the arrow A of FIG. 4, a portion of the combustion gas introduced into the inlet end 210 may be exhausted to outside the exhaust duct 200 through the first outlet end 220. The first outlet end 220 may be arranged to be symmetrical with respect to a central axis AX2. In an embodiment, the diameter of the first outlet end 220 may be smaller than the diameter of the inlet end 210. In an embodiment, the central axis AX2 may be located on the XY plane of FIG. 4. Alternatively, the central axis AX2 may be inclined at a certain angle with respect to the central axis AX1.

The second outlet end 230 may be arranged to be symmetrical with the first outlet end 220 with respect to the central axis AX1. As indicated by the arrow B of FIG. 4, another portion of the combustion gas introduced into the inlet end 210 may be exhausted to outside the exhaust duct 200 through the second outlet end 230. The second outlet end 230 may be arranged to be symmetrical with respect to a central axis AX3. In an embodiment, the diameter of the second outlet end 230 may be smaller than the diameter of the inlet end 210. The second outlet end 230 may constitute the outlet end of the exhaust duct 200 together with the first outlet end 220. In an embodiment, the central axis AX3 may be located on the XY plane of FIG. 4. Alternatively, the central axis AX3 may be inclined at a certain angle with respect to the central axis AX1.

In an embodiment, the central axis AX1 of the inlet end 210, the central axis AX2 of the first outlet end 220, and the central axis AX3 of the second outlet end 230 may all be arranged on the same plane. Also, the plane may be parallel to the XY plane. In another embodiment, although not illustrated in the drawings, at least one of the central axis AX1 of the inlet end 210, the central axis AX2 of the first outlet end 220, and the central axis AX3 of the second outlet end 230 may be arranged on different planes. That is, the first outlet 220 end and the second outlet 230 end may be arranged not to face directly away from each other.

The first housing 240 may form the outer surface of the exhaust duct 200. The first housing 240 may include a first body 241 and second bodies 242.

Referring to FIGS. 4 and 6, the first body 241 may be spaced apart from the central axis AX1 by the radius of the inlet end 210 in the radial direction. The first body 241 may extend along the central axis AX1 from the inlet end 210 to form the outer wall of the inlet end 210.

The second bodies 242 may extend on respective sides (e.g. two sides) of the first body 241 to form the outlet end.

For example, one of the second bodies 242 may extend from the first body 241 in the direction of the central axis AX2 to form the outer wall of the first outlet end 220. Also, another of the second bodies 242 may extend from the first body 241 in the direction of the central axis AX3 to form the outer wall of the second outlet end 230. That is, the first body 241 and the second bodies 242 may constitute an outer cover of the exhaust duct 200.

The second housing 250 may be spaced apart from the first body 241 to form the inner wall of the inlet end 210. Also, the second housing 250 may extend curvedly toward the second bodies 242. For example, as illustrated in FIG. 6, a portion of the second housing 250 may be arranged on the opposite side in the thickness direction of the exhaust duct 200 with respect to the first body 241. Also, another portion of the second housing 250 may extend in the same direction as the extension direction from the first body 241 to the second bodies 242. That is, the second housing 250 may constitute an inner cover of the exhaust duct 200.

In FIGS. 4 to 6, the first housing 240 and the second housing 250 are illustrated only on one surface of the exhaust duct 200; however, the first housing 240 and the second housing 250 may also be formed on the other surface of the exhaust duct 200.

The connection housings 260 may be arranged between the first housing 240 and the second housing 250 to connect the first housing 240 to the second housing 250. For example, the connection housings 260 may be formed between the first housing 240 and the second housing 250 and may be an edge portion curved convexly outward.

The connection housings 260 may be arranged between the first outlet end 220 and the second outlet end 230. For example, as illustrated in FIG. 5, each of the connection housings 260 (one of the connection housings 260 is shown in FIG. 5) may be arranged to be symmetrical with respect to the central axis AX1. The connection housings 260 may be arranged as a pair to be symmetrical in one direction. For example, the connection housings 260 may be arranged to be symmetrical with each other in the X-axis direction of FIG. 6.

In another embodiment, although not illustrated in the drawings, a pair of the connection housings 260 may be arranged asymmetrically with each other.

Each of the connection housings 260 may include a pair of recess portions 261 and connection portions 262.

Each of the recess portions 261 may be a region recessed toward the inlet end 210 in the connection housings 260. The pair of the recess portions 261 may be arranged in parallel to the central axis AX1 and the pair of the recess portions 261 may be arranged to be symmetrical with respect to the central axis AX1. For example, as illustrated in FIG. 5, when viewed on a plane parallel to the XY plane (hereinafter also referred to as "first plane"), the connection housings 260 (one of the connection housings 260 is illustrated in FIG. 5) may have a virtual extension line extending from the first outlet end 220 to the second outlet end 230 and the recess portions 261 may be arranged at the center of the virtual extension line.

In an embodiment, the recess portions 261 may be arranged to face each other. Also, the recess portions 261 may be arranged to connect a pair of outlet ends, that is, the first outlet end 220 and the second outlet end 230.

The recess portions 261 may include a splitter 261a and flow guides 261b. As shown in FIG. 5, a pair of the recess portions 261 may share a single splitter 261a.

Referring to FIGS. 5 and 6, the splitter 261a may be a region where the combustion gas introduced from the inlet end 210 collides to be diverged to the first outlet end 220 and the second outlet end 230. When viewed on the first plane, the splitter 261a may have a shape recessed toward the inlet end 210 to have a second curvature radius r2 with respect to a second curvature center O2. Here, the second curvature center O2 may be located outside the connection housings 260 when viewed on the first plane. That is, the second curvature center O2 may be located outside a region partitioned by the first housing 240, the second housing 250, and the connection housings 260.

FIG. 7 is a cross-sectional view of the exhaust duct 200 taken along line VII-VII of FIG. 4, more particularly, a cross-sectional view viewed on a plane including the central axis AX1 and parallel to the XZ plane (hereinafter also referred to as "second plane").

Referring to FIG. 7, the splitter 261a of one pair of recess portions 261 may be formed at one side in the Z-axis direction and the splitter 261a of another pair of the recess portions 261 may be formed at the other size in the Z-axis direction. Also, the centers of each splitter 261a may be respectively arranged on a central axis AX4 and a central axis AX5. Each of the central axis AX4 and the central axis AX5 may pass through the center of a respective one splitter 261a, the center being defined in the height direction, for example, in the Z-axis direction of FIG. 7, and each of the central axis AX4 and the central axis AX5 may be parallel to the central axis AX1.

When viewed on the second plane, each splitter 261a may have a shape recessed in the direction away from the inlet end 210 to have a first curvature radius r1 with respect to a first curvature center O1. Here, the first curvature center O1 may be located inside the first body 241 when viewed on the second plane. That is, the first curvature center O1 may be located inside a region partitioned by the first housing 240, the second housing 250, and the connection housings 260.

In an embodiment, the first curvature radius r1 and the second curvature radius r2 may satisfy a relationship of $0.91r1 < r2 < 1.35r1$. More particularly, a relationship of $r1 < r2 < 1.35r1$ may be satisfied. That is, the second curvature radius r2 may be greater than the first curvature radius r1. When r1 is greater than or equal to r2, the pressure loss of the combustion gas may increase excessively and thus the aerodynamic characteristics may be degraded. On the contrary, when r2 is greater than or equal to 1.35r1, the thermal stress acting on the splitter 261a may increase excessively and thus the stress characteristic may be degraded and the life of the exhaust duct 200 may be shortened.

That is, the first curvature radius r1 and the second curvature radius r2 may be a factor determining the shape of the splitter 261a, and the aerodynamic characteristics, stress characteristics, and life characteristics of the exhaust duct 200 may all be satisfied by setting the first curvature radius r1 and the second curvature radius r2 in the above range.

In an embodiment, the distance from the central axis AX1 to the central axis AX4 and the distance from the central axis AX1 to the central axis AX5 may be equal to a first distance d1. That is, each splitter 261a may be spaced apart from the central axis AX1 by the same distance in the Z-axis direction. In another embodiment, the distances from the central axis AX1 to the central axis AX4 and the central axis AX5 may be different from each other.

Each splitter 261a may be a region directly colliding with the combustion gas and thus an excessive thermal stress may be concentrated thereon. In an embodiment, each splitter 261a may have the greatest thickness in the connection housings 260. That is, when viewed on the second plane, the first curvature radius r1 of the splitter 261*a* may be greater than the curvature radius of the other region of the connection housings 260.

Referring to FIGS. 5 to 7, the flow guides 261*b* may be arranged on both sides of each splitter 261*a*, respectively, to guide the flow of the combustion gas that collides with each splitter 261*a* to be split into both sides. The flow guides 261*b* may extend to one side and the other side from the splitter 261*a*.

In an embodiment, as illustrated in FIG. 5, two of the flow guides 261*b* may extend from the splitter 261*a* to be inclined by a certain angle θ with respect to the central axis AX1. The range of the angle θ is not particularly limited but may be about 30° or more and about 40° or less. When θ is less than about 30°, an excessive great thermal stress may be concentrated on the splitter 261*a*. Accordingly, the stress characteristics and life characteristics of the exhaust duct 200 may be degraded. On the contrary, when is more than about 40°, the pressure loss of the combustion gas may increase excessively and thus the aerodynamic characteristics may be degraded.

In an embodiment, the flow guides 261*b* may have an inclination parallel to a tangent line at both ends of the splitter 261*a*. That is, as illustrated in FIG. 5, when viewed on the first plane, when an external tangent line is drawn at each of both ends of an arc corresponding to the shape of the splitter 261*a*, the external tangent line may correspond to the shape of the flow guides 261*b*. Accordingly, the collision of the combustion gas collided and diverged by each splitter 261*a* with the flow guides 261*b* may be minimized to reduce the pressure loss and the aerodynamic loss.

The connection portions 262 may be arranged on respective sides of the each pair of recess portions 261 to connect each outlet end and the recess portions 261. The connection portions 262 may be arranged on outer sides of the flow guides 261*b* and may extend to be narrowed toward each outlet end. Also, as illustrated in FIG. 6, one of the connection portions 262 may contact an opposite one of the connection portions 262 at each outlet end.

In an embodiment, the connection portions 262 may have a third curvature radius r3. For example, as illustrated in FIG. 5, when viewed on the first plane, each of the connection housings 260 (one of the connection housings 260 is illustrated in FIG. 5) may have a virtual extension line extending from the first outlet end 220 and the second outlet end 230. The virtual extension line may be an arc that extends along the outer surface of each of the connection portions 262 and has a third curvature radius r3 from a third curvature center O3 arranged on the central axis AX1. That is, when viewed on the first plane, the outer surface of the connection portions 262 may be curved. The third curvature center O3 may be arranged outside the exhaust duct 200, and the third curvature radius r3 may be greater than the first curvature radius r1 and the second curvature radius r2. However, embodiments of the present disclosure is not limited thereto and the outer surface of the connection portion 262 may be straight when viewed on the first plane.

Referring back to FIG. 4, among the entire combustion gas, the combustion gas flowing from the inlet end 210 to the first outlet end 220 may flow through a first flow path 270. Also, among the entire combustion gas, the combustion gas flowing from the inlet end 210 to the second outlet end 230 may flow through a second flow path 280.

The first flow path 270 and the second flow path 280 may be an internal space partitioned by the first housing 240, the second housing 250, and the connection housings 260. The first flow path 270 and the second flow path 280 are divided by each splitter 261*a* and may be formed to be symmetrical with respect to the central axis AX1.

Referring to FIG. 5, a bore 290 may be formed in the exhaust duct 200. The bore 290 may be a region partitioned by the second housing 250 and an inner ring 291 located at an inner side from the inlet end 210 in the X-axis direction. The inner ring 291 may be an annular member, may have a diameter smaller than the diameter of the inlet end 210, and may form a concentric circle with the inlet end 210.

An internal space 292 in which the driving shaft and/or the low-pressure turbine 20 is arranged may be formed in the bore 290. In an embodiment, the distance from the second curvature center O2 of each splitter 261*a* to the inner ring 291 may be defined as a second distance d2.

In an embodiment, the first distance d1 and the second distance d2 may satisfy a relationship of $0.6875 d2 < d1 < 1.875 d2$. When d1 is smaller than or equal to $0.6875 d2$, the degree of curvature of the splitter 261*a* toward the inlet end 210 may decrease excessively and thus the pressure loss of the combustion gas may increase and accordingly the aerodynamic characteristics may be degraded. On the contrary, when d1 is greater than or equal to $1.875 d2$, the degree of curvature of the splitter 261*a* toward the inlet end 210 may increase excessively and thus the thermal stress may be concentrated on the splitter 261*a* and thus the stress characteristics may be degraded. Accordingly, the life of the exhaust duct 200 may be shortened.

An aircraft according to an embodiment may include an exhaust duct assembly 10. For example, referring to FIGS. 1 and 2, the aircraft may include a propeller 80 arranged at a front end thereof, a driving engine connected to the propeller 80 through a driving shaft, and an exhaust duct assembly 10 for discharging the combustion gas discharged from the driving engine, to the outside. Here, the driving engine may be a member necessary to drive the aircraft and may include, for example, the low-pressure turbine 20, the high-pressure turbine 30, the combustor 40, the compressor 50, and the nacelle 70 of FIG. 1. In addition, the aircraft may include components required for driving, such as a main wing and an auxiliary wing.

The exhaust duct 200 according to embodiments and the exhaust duct assembly 10 and the aircraft using the exhaust duct 200 may include the recess portions 261 having a particular shape toward the inlet end 210 in the connection housings 260 connecting the first housing 240 and the second housing 250 constituting the inner and outer walls of the exhaust duct 200. Through this configuration, the thermal stress concentrated on each splitter 261*a* of the recess portions 261 by the combustion gas flowing into the exhaust duct 200 may be reduced and simultaneously the pressure loss of the combustion gas exhausted through the first outlet end 220 and the second outlet end 230 may be reduced. Accordingly, the exhaust duct 200 and the exhaust duct assembly 10 and the aircraft using the exhaust duct 200 according to embodiments may be compatible in excellent aerodynamic characteristics, stress characteristics, and life characteristics.

Also, in the exhaust duct 200, the exhaust duct assembly 10, and the aircraft using the exhaust duct 200 according to embodiments, the relationship between the first curvature radius r1, the second curvature radius r2, the third curvature radius r3, the first distance d1, the second distance d2, and the angle may be specified, thereby making it possible for the exhaust duct 200, the exhaust duct assembly 10, and the aircraft using the exhaust duct 200 to achieve better aerodynamic characteristics, stress characteristics, and life characteristics.

In the exhaust duct, the exhaust duct assembly, and the aircraft using the exhaust duct according to embodiments, the thermal stress concentrated on the splitter of the recess portions by the combustion gas flowing into the exhaust duct may be reduced and simultaneously the pressure loss of the combustion gas exhausted through the outlet end may be reduced to reduce the aerodynamic loss. The exhaust duct, the exhaust duct assembly, and the aircraft using the exhaust duct according to embodiments may achieve excellent aerodynamic characteristics, stress characteristics, and life characteristics.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure.

What is claimed is:

1. An exhaust duct through which combustion gas is diverged and discharged from an inlet end to a first outlet end and a second outlet end at respective sides of the exhaust duct, the exhaust duct comprising:
   a first housing including a first body forming an outer wall of the inlet end, and further including second bodies respectively extending on respective sides from the first body and respectively forming the first outlet end and the second outlet end;
   a second housing spaced apart from the first body, forming an inner wall of the inlet end, and extending curvedly toward the second bodies; and
   a connection housing connecting the first housing to the second housing and including at least one recess portion recessed toward the inlet end,
   wherein the at least one recess portion includes:
      a splitter which is adjacent to the inlet end, the splitter configured to diverge the combustion gas to the respective sides of the exhaust duct; and
      flow guides arranged on a side of the splitter towards the first outlet end and a side of the splitter towards the second outlet end, respectively, the flow guides each having a preset inclination,
   wherein the splitter has a shape recessed toward the inlet end such as to have a curvature radius with respect to an outer curvature center of the splitter,
   wherein an inner curvature center of the splitter is spaced a first distance d1 perpendicular to a central axis of the exhaust duct,
   wherein the exhaust duct further comprises an inner ring located at an inner side from the inlet end and spaced a second distance d2 perpendicular to the outer curvature center, and
   wherein the first distance d1 and the second distance d2 satisfy a relationship of $0.6875d2 < d1 < 1.875d2$.

2. The exhaust duct of claim 1, wherein the at least one recess portion is arranged at a center of a virtual extension line that extends from the first outlet end to the second outlet end.

3. The exhaust duct of claim 1, wherein the at least one recess portion of the connection housing includes a pair of recess portions, and the pair of recess portions is arranged to face each other and arranged to connect the first outlet end and the second outlet end.

4. The exhaust duct of claim 1, wherein each of the flow guides has a preset inclination angle with respect to an axial direction of the exhaust duct.

5. The exhaust duct of claim 4, wherein the preset inclination angle of each of the flow guides is greater than or equal to 30°.

6. The exhaust duct of claim 5, wherein the preset inclination angle of each of the flow guides is less than or equal to 40°.

7. The exhaust duct of claim 1, wherein a tangent line at a first end of the splitter is parallel to an outer surface of one of the flow guides, and a tangent line at a second end of the splitter is parallel to an outer surface of another of the flow guides.

8. The exhaust duct of claim 1, wherein
   each of the at least one recess portion has a curvature radius having a curvature center arranged inside the first body, the curvature radius of each of the at least one recess portion connecting the first body to the second housing, and
   the connection housing has surfaces arranged along a virtual extension line extending from the first outlet end and the second outlet end at the respective sides of the exhaust duct, wherein the virtual extension line has a curvature radius having a curvature center arranged outside the connection housing, and the curvature radius of the virtual extension line is greater than the curvature radius of each of the at least one recess portion.

9. The exhaust duct of claim 8, wherein the curvature radius of the virtual extension line is greater than the curvature radius of each of the at least one recess portion and the curvature radius of the splitter.

10. The exhaust duct of claim 1, wherein
    each of the at least one recess portion has a curvature radius having a curvature center arranged inside the first body, the curvature radius of each of the at least one recess portion connecting the first body to the second housing,
    the exhaust duct is configured to satisfy a relationship of $r1 < r2 < 1.35r1$, wherein r1 is the curvature radius of each of the at least one recess portion and r2 is the curvature radius of the splitter.

11. An exhaust duct assembly comprising:
    an exhaust duct configured to exhaust combustion gas by diverging and discharging the combustion gas from an inlet end to a first outlet end and a second outlet end at respective sides of the exhaust duct;
    a housing in which the exhaust duct is arranged and which includes mounting ports into which the first outlet end and the second outlet end are inserted, respectively; and
    a first reinforcement body and a second reinforcement body, one side of the first reinforcement body mounted onto the housing and another side of the first reinforcement body supporting an end portion of the first outlet end, and one side of the second reinforcement body mounted onto the housing and another side of the second reinforcement body supporting an end portion of the second outlet end,
    wherein the exhaust duct comprises:
       a first housing including a first body forming an outer wall of the inlet end, and further including second bodies respectively extending on respective sides from the first body and respectively forming the first outlet end and the second outlet end;

a second housing spaced apart from the first body, forming an inner wall of the inlet end, and extending curvedly toward the second bodies; and a connection housing connecting the first housing to the second housing and including at least one recess portion recessed toward the inlet end, wherein the at least one recess portion comprises:

a splitter which is adjacent to the inlet end, the splitter configured to diverge the combustion gas to the respective sides of the exhaust duct; and flow guides arranged on a side of the splitter towards the first outlet end and a side of the splitter towards the second outlet end, respectively, the flow guides each having a preset inclination, wherein the splitter has shape recessed toward the inlet end such as to have a curvature radius with respect to an outer curvature center of the splitter, wherein an inner curvature center of the splitter is spaced a first distance d1 perpendicular to a central axis of the exhaust duct, wherein the exhaust duct further comprises an inner ring located at an inner side from the inlet end and spaced a second distance d2 perpendicular to the outer curvature center, and wherein the first distance d1 and the second distance d2 satisfy a relationship of $0.6875d2<d1<1.875d2$.

12. The exhaust duct assembly of claim 11, wherein the at least one recess portion of the connection housing includes a pair of recess portions, and the pair of recess portions is arranged to face each other and arranged to connect the first outlet end and the second outlet end.

13. An aircraft comprising:

a propeller arranged at a front end thereof;

a driving engine connected to the propeller; and an exhaust duct configured to exhaust combustion gas discharged from the driving engine, to an outside, wherein the exhaust duct is configured to diverge and discharge the combustion gas from an inlet end to a first outlet end and a second outlet end at respective sides of the exhaust duct, and the exhaust duct comprises:

a first housing including a first body forming an outer wall of the inlet end, and further including second bodies respectively extending on respective sides from the first body and respectively forming the first outlet end and the second outlet end;

a second housing spaced apart from the first body, forming an inner wall of the inlet end, and extending curvedly toward the second bodies; and a connection housing connecting the first housing to the second housing and including at least one recess portion recessed toward the inlet end, wherein the at least one recess portion comprises:

a splitter which is adjacent to the inlet end, the splitter configured to diverge the combustion gas to the respective sides of the exhaust duct; and flow guides arranged on a side of the splitter towards the first outlet end and a side of the splitter towards the second outlet end, respectively, the flow guides each having a preset inclination, wherein the splitter has a shape recessed toward the inlet end such as to have a curvature radius with respect to an outer curvature center of the splitter, wherein an inner curvature center of the splitter is spaced a first distance d1 perpendicular to a central axis of the exhaust duct, wherein the exhaust duct further comprises an inner ring located at an inner side from the inlet end and spaced a second distance d2 perpendicular to the outer curvature center, and wherein the first distance d1 and the second distance d2 satisfy a relationship of $0.6875d2<d1<1.875d2$.

14. The aircraft of claim 13, wherein the at least one recess portion of the connection housing includes a pair of recess portions, and the pair of recess portions is arranged to face each other and arranged to connect the first outlet end and the second outlet end.

* * * * *

UNITED STATES PATENT AND TRADEMARK OFFICE
CERTIFICATE OF CORRECTION

| | | |
|---|---|---|
| PATENT NO. | : 11,319,897 B2 | Page 1 of 1 |
| APPLICATION NO. | : 16/834180 | |
| DATED | : May 3, 2022 | |
| INVENTOR(S) | : Young Jung Joo, Hee Yoon Chung and Eray Akcayoz | |

It is certified that error appears in the above-identified patent and that said Letters Patent is hereby corrected as shown below:

On the Title Page

Item (73) should appear as follows:
(73) Assignees: HANWHA AEROSPACE CO., LTD.,
Changwon-si (KR);
Pratt & Whitney Canada Corp.,
Quebec (CA)

Signed and Sealed this
Twentieth Day of May, 2025

Coke Morgan Stewart
*Acting Director of the United States Patent and Trademark Office*